UNITED STATES PATENT OFFICE.

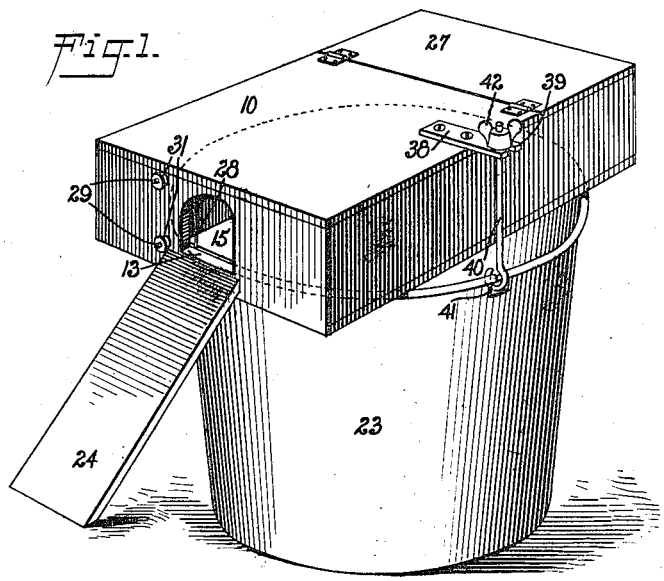
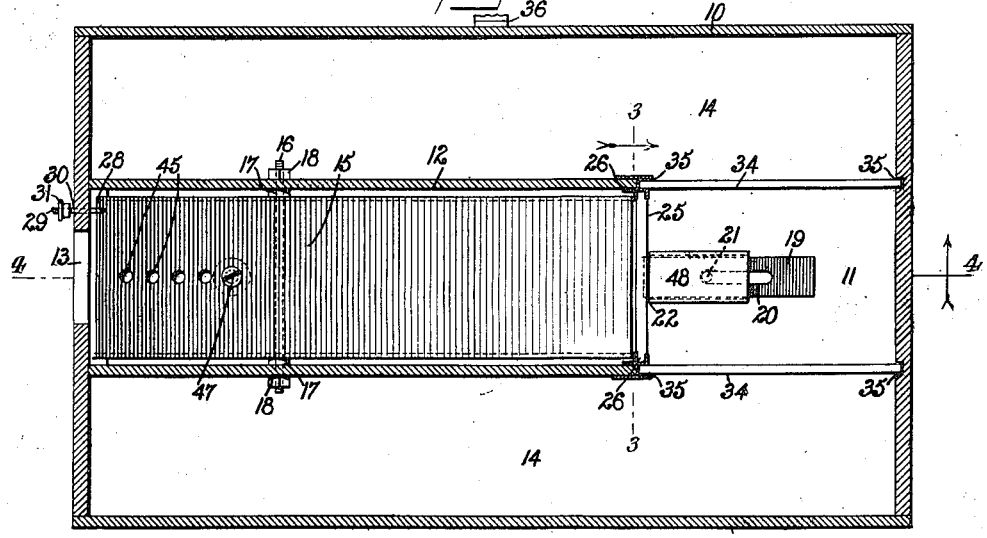
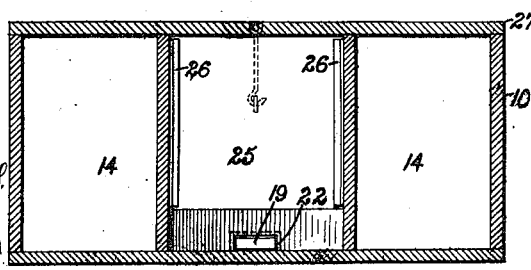

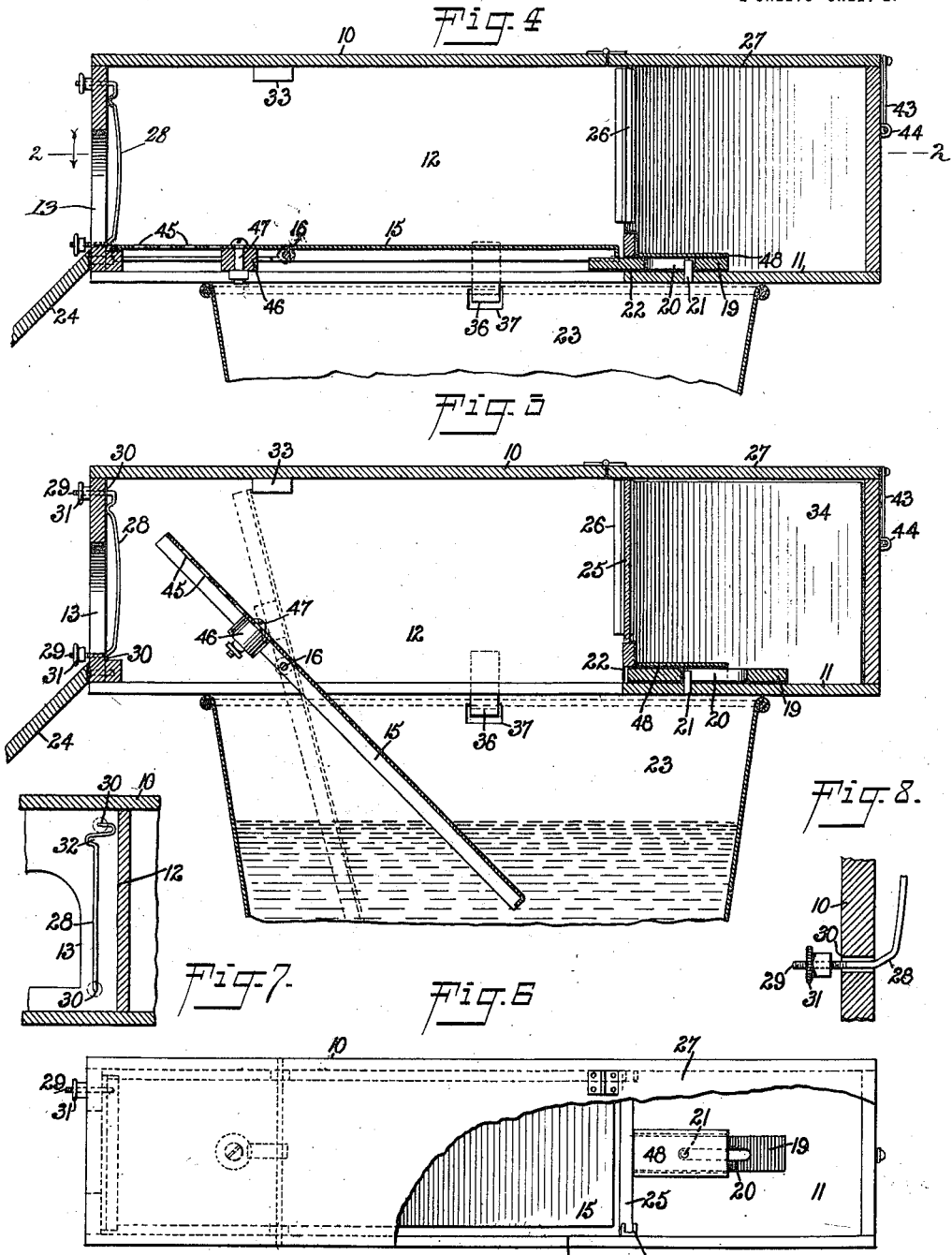

ALBERT ELLSWORTH LYCAN, OF KOOSKIA, IDAHO.

TRAP.

1,272,974. Specification of Letters Patent. Patented July 16, 1918.

Application filed June 22, 1917. Serial No. 176,371.

*To all whom it may concern:*

Be it known that I, ALBERT E. LYCAN, a citizen of the United States, and a resident of Kooskia, in the county of Idaho and State of Idaho, have invented a new and Improved Trap, of which the following is a full, clear, and exact description.

My invention has for its object to provide a trap for catching mice, rats and weasels, the trap being constructed with a tilting bottom which may be secured in position, and over which the mice may safely pass to the bait compartment, which they may visit for a sufficient period to make them familiar with the trap, after which the tilting bottom may be freed and a glass panel may be disposed between the end of the tilting bottom and the bait compartment.

Another object of the invention is to provide a spring for engaging the tilting bottom which will hold the tilting bottom steady, so that the animal may pass beyond the balance of the tilting bottom, when the spring will permit the tilting bottom to operate quickly, with the result that the animal will fall into a compartment disposed below the tilting bottom.

Additional objects of the invention will appear in the following specification, in which the preferred form of the invention is disclosed.

In the drawings similar reference characters denote similar parts in all the views, in which—

Figure 1 is a perspective view illustrating the trap in operative position;

Fig. 2 is a sectional view on the line 2—2 of Fig. 4;

Fig. 3 is a sectional view on the line 3—3 of Fig. 2;

Fig. 4 is a sectional view on the line 4—4 of Fig. 2;

Fig. 5 is a view similar to that shown in Fig. 4 of the drawings, but showing the tilting bottom in position to permit a mouse to fall into the compartment containing water;

Fig. 6 is a top view showing a modified form of the invention, the roof being partly broken away; and Figs. 7 and 8 are sectional fragmentary views illustrating the spring which is provided for engaging the tilting bottom.

By referring to the drawings, it will be seen that the trap is constructed with a body 10 having a bait compartment 11, a passage 12 leading from the entrance 13 to the bait compartment 11, and two passages 14 extending at the sides of the passage 12 and the bait compartment. There is a tilting bottom 15 in the passage 12 which leads from the entrance 13 to the bait compartment 11, the said tilting bottom 15 being mounted to rock on a bolt 16, washers 17 being mounted on the bolt 16 between the tilting bottom, 15 and the sides of the passage 12. The terminals of the bolts 16 are disposed in orifices in the body 10 at the side of the passage 19. Nuts 18 mesh with the threaded terminals of the bolt 16 for securing the bolt in place.

At the bottom of the bait compartment 11 there is a slide bolt 19 provided with a slot 20 in which a pin 21 is disposed, the pin 21 being rigidly secured in an orifice in the bottom of the bait compartment 11. This slide bolt 19 passes through a guideway 22 and is adapted to engage the under side of the rear of the tilting bottom 15, so that when the bolt 22 is in the position indicated in Fig. 4 of the drawings the bottom 15 will be prevented from tilting when a mouse passes from the entrance 13 to the bait compartment 11. With the tilting bottom 15 locked in this manner, a quantity of bait is disposed in the compartment 11, and if occasion should require additional bait is disposed in the passages 14. With the trap baited in this manner, it is disposed in position on a pail or receptacle 23, and a plank or shingle 24 is disposed from the ground to the entrance 13, so that the mice may enter and become familiar with the trap while eating the bait. When the mice feel thoroughly at home, after making a number of visits to the trap, the slide bolt 19 is moved to the position indicated in Figs. 2 and 5 of the drawings, and a glass panel 25 is introduced in the guideways 26, to cut off communication between the passage 12 and the bait compartment 11. A hinged lid 27 at the top of the rear of the body is raised to permit of the introduction of the glass panel. When the mice make another visit to the trap, with which they have become thoroughly familiar, they will pass through the entrance 13 on the tilting bottom 15 to a position where the said bottom will tilt, as indicated in Fig. 5 of the drawings, and precipitate the mice into the compartment 23, which may contain water as has been stated. The glass panel 25, while it permits the mice to see the bait in the compartment 11 which they have previously visited, prevents the mice from jumping from the tilting bottom to the bait compartment. The tilting bottom 15 is held steady by means of a spring 28 until the mice have passed a considerable distance beyond the balance point of the tilting bottom, and there is no chance for the mouse to escape when the tilting bottom operates. This spring 28 is disposed vertically at the inner side of the trap, and it is provided with two threaded terminals 29 which pass through orifices 30 in the body, nuts 31 meshing with the threaded terminals at the outer side of body, so that the spring 28 may be adjusted as desired. In order to assist in adjusting the spring 28, the said spring is S-shaped at 32 adjacent one of the terminals. There is a stop 33 at the top of the body which limits the movement of the tilting bottom 15 when it operates, the extreme position of the tilting bottom against the stop being indicated by the dotted lines in Fig. 5 of the drawings.

When it is not desired to make use of the passages 14, in which the mice may feed while they become familiar with the trap, panels 34 may be slid in guideways 35 to cut off communication between the bait compartment 11 and the passages 14.

It is also desirable when the trap is being set for weasels to place one or more chicks in the compartment 11, with the glass panel 25 in position, and also with the panels 34 in position. When this has been done, and when the slide bolt 19 has been moved rearwardly, the weasels may enter the trap at its entrance 13, and see the chicks in the compartment 11. The weasels will pass along the tilting bottom 15, and will be thrown into the receptacle 23 in the manner which has been described, without injury to the chicks.

The body 10 is preferably provided at one side with a depending hook 36 which may be inserted in the opening 37 in the pail or receptacle 23. At the other side the body 10 is provided with an extending flange 38 having a slot 39 in which may be disposed a bolt 40 which is articulated at 41 to the pail or receptacle 23. When the hook 36 is disposed in the opening 37, and the bolt 40 is disposed in the slot 39, a thumb nut 42 may be turned home on the bolt 40 against the flange 38 to lock the body 10 in position on the pail or receptacle 23. A spring hook 43 is pivoted to the lid 27, and is disposed for engagement with an eye 44 secured to the rear of the body 10.

There are orifices 45 in the tilting bottom 15 which permit of the adjustment of the weight 46, the said weight being supported by a bolt 47 which is disposed in one of the orifices. There is a guard 48 disposed over the slide bolt 19.

The modified form of the invention shown in Fig. 7 of the drawings corresponds with the form shown in the other figures, except that the passages 14 are eliminated.

Having thus described my invention, I claim as new and desire to secure by Letters Patent:

1. In a trap, a body having a bait compartment, a passage leading thereto and a passage leading therefrom, a tilting bottom in the first passage, means for locking the tilting bottom, a panel for separating the bait compartment from the second passage, and a glass panel for separating the first passage from the bait compartment.

2. A trap having a body with a bait compartment and a passage leading thereto, a tilting bottom in the passage, a spring engaging the tilting bottom and having a projection engaging the body, and means for adjusting the spring relatively to the body.

3. A trap having a body with two orifices, a bait compartment and a passage leading thereto, a tilting bottom in the passage, a spring engaging the tilting bottom and having a projection engaging the body and two threaded terminals disposed in the orifices, and nuts meshing with the threaded terminals and engaging the body to hold the spring in adjusted position.

4. A trap having a body with two orifices, a bait compartment and a passage leading thereto, a tilting bottom in the passage, a spring engaging the tilting bottom and having a fulcrum adjacent the body and two threaded terminals disposed in the orifices, and nuts meshing with the threaded terminals and engaging the body to hold the spring in adjusted position.

ALBERT ELLSWORTH LYCAN.